US011791673B2

(12) United States Patent
Bramhe et al.

(10) Patent No.: US 11,791,673 B2
(45) Date of Patent: Oct. 17, 2023

(54) STATOR ROUTING SYSTEM

(71) Applicant: STEERING SOLUTIONS IP HOLDING CORPORATION, Saginaw, MI (US)

(72) Inventors: Mangesh Bramhe, Flint, MI (US); Eric D. Pattok, Frankenmuth, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 379 days.

(21) Appl. No.: 17/036,106

(22) Filed: Sep. 29, 2020

(65) Prior Publication Data

US 2021/0111595 A1    Apr. 15, 2021

Related U.S. Application Data

(60) Provisional application No. 62/914,056, filed on Oct. 11, 2019.

(51) Int. Cl.
| | | |
|---|---|---|
| *H02K 1/16* | (2006.01) | |
| *H02K 1/276* | (2022.01) | |
| *H02K 5/04* | (2006.01) | |
| *H02K 3/28* | (2006.01) | |
| *H02K 3/02* | (2006.01) | |
| *H02K 3/12* | (2006.01) | |

(52) U.S. Cl.
CPC ............... *H02K 1/16* (2013.01); *H02K 1/276* (2013.01); *H02K 3/02* (2013.01); *H02K 3/12* (2013.01); *H02K 3/28* (2013.01); *H02K 5/04* (2013.01)

(58) Field of Classification Search
CPC ............ H02K 1/16; H02K 1/276; H02K 3/02; H02K 3/12; H02K 3/28; H02K 5/04; H02K 5/225; H02K 2203/06; H02K 3/522; H02K 1/165; H02K 3/46; H02K 2203/12
USPC ..................................................... 310/201, 71
See application file for complete search history.

(56) References Cited

U.S. PATENT DOCUMENTS

2011/0254387 A1\* 10/2011 Matsuda ............. B62D 5/0406
310/43

FOREIGN PATENT DOCUMENTS

| DE | 69833475 T2 | 8/2006 |
|---|---|---|
| DE | 102015290086 A1 | 7/2016 |
| DE | 102015091096 A1 | 9/2016 |

(Continued)

OTHER PUBLICATIONS

WO 2016035755; Asada Toshiaki (Year: 2016).\*

(Continued)

*Primary Examiner* — Ahmed Elnakib
(74) *Attorney, Agent, or Firm* — Dickinson Wright PLLC

(57) ABSTRACT

A stator for a vehicle includes a body defining a central bore that is adapted to receive a rotor. The stator also includes a plurality of electrical conductors radially disposed on the body. Each of respective electrical conduction of the plurality of electrical conductors includes a corresponding magnetic core wound in a conductive wire. The stator also includes a wired frame that includes one or more conductive wires. Each of the one or more conductive wires includes a first end and a second end opposite the first end. Each respective first end of the one or more conductive wires is connected to corresponding terminals of the stator. Each respective second end of the one or more conductive wires is bent at an angle and adapted to mate with a controller.

17 Claims, 4 Drawing Sheets

(56) References Cited

FOREIGN PATENT DOCUMENTS

EP    3133696    2/2017
JP    WO 2015119214    *    8/2015

OTHER PUBLICATIONS

Official Letter from the German Patent and Trademark Office for related German Patent Application No. 102020126354.6 dated Sep. 24, 2021, 6 page(s).

* cited by examiner

STATOR ROUTING SYSTEM

CROSS-REFERENCES TO RELATED APPLICATIONS

This patent application claims priority to U.S. Provisional Patent Application Ser. No. 62/914,056, filed Oct. 11, 2019, which is incorporated herein by reference in its entirety.

TECHNICAL FIELD

This disclosure relates to stators and in particular to stator routing systems.

BACKGROUND OF THE INVENTION

Vehicles, such as cars, trucks, sport utility vehicles, crossovers, mini-vans, marine craft, aircraft, all-terrain vehicles, recreational vehicles, or other suitable vehicles, may include one or more electromagnetic motors. Such electromagnetic motors typically include a stator and a rotor. The stator includes a stationary component of the electromagnetic motor and the rotor includes a rotating component of the electromagnetic motor.

Typically, energy flows through the stator to or from the rotor in response to the rotor rotating. Stators commonly include one or more electrical conductors comprising a core wound in conductive wire. The rotating component typically includes one or more permanent magnets radially disposed on the rotor. An electric current is typically applied or induced in the electrical conductors to generate a magnetic field that transfers energy to or from the rotor, which may cause the rotor to rotate.

SUMMARY OF THE INVENTION

This disclosure relates generally to stator systems.

An aspect of the disclosed embodiments includes a stator for a vehicle. The stator may include a body defining a central bore that is adapted to receive a rotor. The stator may also include a plurality of electrical conductors radially disposed on the body. The stator may also include a wired frame that includes one or more conductive wires, each of the one or more conductive wires having first end and a second end opposite the first end, wherein each respective first end of the one or more conductive wires is connected to corresponding terminals of the stator, and wherein each respective second end of the one or more conductive wires is bent at an angle to form respective terminals and adapted to mate with a controller.

Another aspect of the disclosed embodiments includes a stator that may include a body defining a central bore that is adapted to receive a rotor. The stator may also include a plurality of electrical conductors radially disposed on the body. The stator may also include a wired frame that includes one or more conductive wires, each of the one or more conductive wires having first end and a second end opposite the first end, wherein each respective first end of the one or more conductive wires is connected to corresponding terminals of the stator, and wherein each respective second end of the one or more conductive wires is bent at an angle to form respective terminals and adapted to mate with corresponding slots disposed on a motor housing, each of the respective terminals being self-retaining with in corresponding slots of the motor housing.

Another aspect of the disclosed embodiments includes an electromagnetic motor that includes a stator. The stator may include a body defining a central bore that is adapted to receive a rotor. The stator may also include a plurality of electrical conductors radially disposed on the body, each of respective electrical conductor of the plurality of electrical conductors including a corresponding magnetic core wound in a conductive wire. The stator may also include a wired frame that includes one or more conductive wires, each of the one or more conductive wires having first end and a second end opposite the first end, wherein each respective first end of the one or more conductive wires is connected to corresponding terminals of the stator, and wherein each respective second end of the one or more conductive wires is bent at an angle to form respective terminals and adapted to mate with corresponding slots disposed on a motor housing, each of the respective terminals being self-retaining with in corresponding slots of the motor housing.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
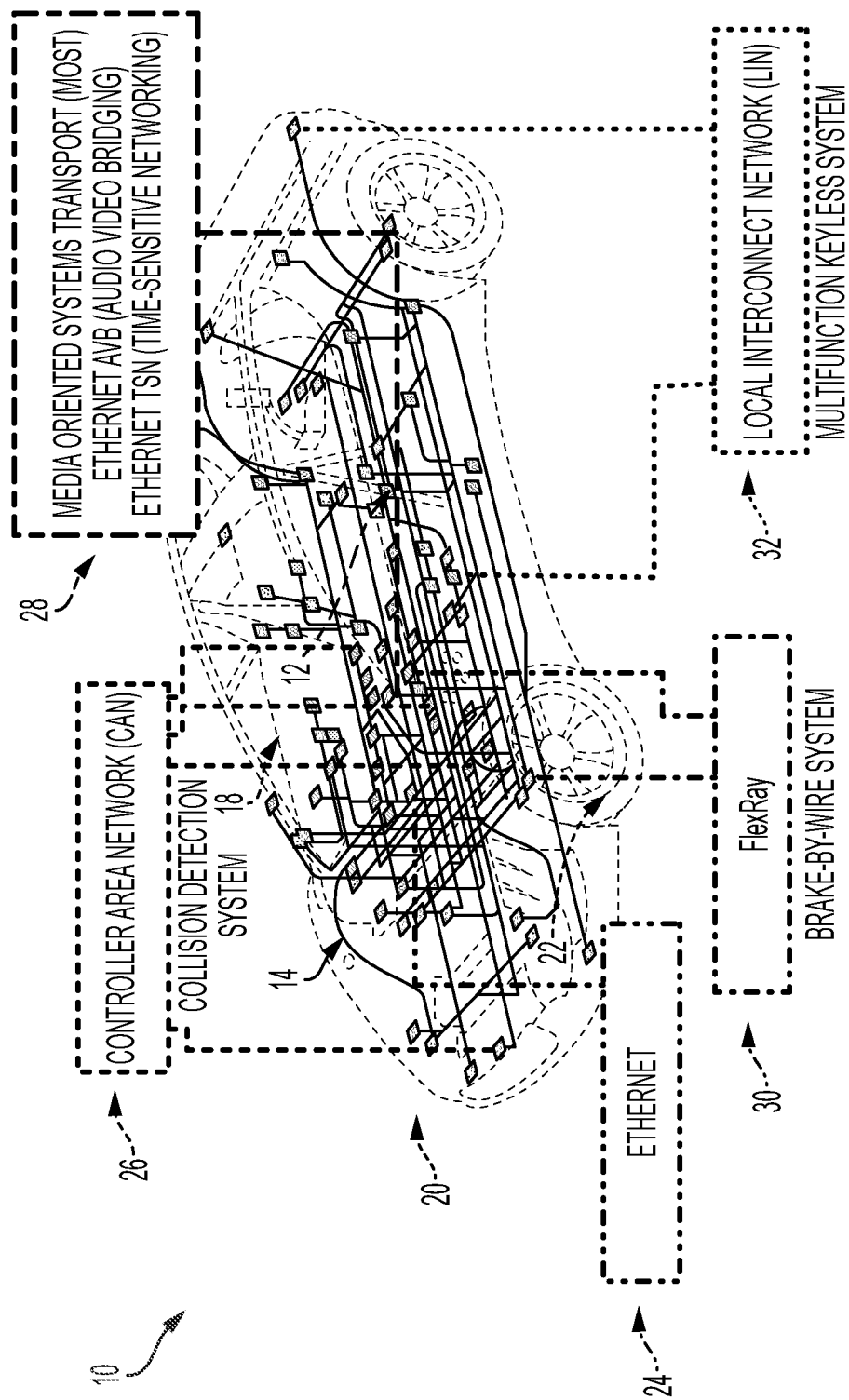
FIG. 1 generally illustrates a vehicle according to the principles of the present disclosure.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, vehicles, such as cars, trucks, sport utility vehicles, crossovers, mini-vans, marine craft, aircraft, all-terrain vehicles, recreational vehicles, may include one or more electromagnetic motors. Such electromagnetic motors typically include a stator and a rotor. The stator includes a stationary component of the electromagnetic motor and the rotor includes a rotating component of the electromagnetic motor.

Typically, energy flows through the stator to or from the rotor in response to the rotor rotating. Stators commonly include one or more electrical conductors comprising a core wound in conductive wire. The rotating component typically includes one or more permanent magnets radially disposed on the rotor. An electric current is applied or induced in the electrical conductors to generate a magnetic field that transfers energy to or from the rotor, which may cause the rotor to rotate.

Typically, a stator includes a copper lead frame comprised of copper sheet cutouts. Such copper lead frames may be relatively expensive to manufacture. Further, providing a copper lead frame with copper sheet cutouts may generate significant material waste. Alternatively, some stators include copper frames that are injection molded with various plastics. However, injection molding of copper frames with plastics may increase the manufacturing costs, which may render stators with lead frames cost prohibitive (e.g., in low-cost applications). Additionally, in such typical stators, separate copper terminals are molded into the copper lead frame, which further increases manufacturing costs.

In addition to the significant costs of the copper lead frame of a typical stator, the copper lead frame may be bulky and may increase a motor housing footprint, which may in turn increase the manufacturing costs associated the motor housing.

Accordingly, systems and apparatuses, such as those described herein, that include a stator that includes an alternative to copper lead frame sheet cutouts, may be desirable. In some embodiments, the systems and apparatuses described herein may include one or more copper wires (e.g., instead of copper lead frame sheet cutouts). Using coper wires instead of sheet cutout may reduce or eliminate copper raw-material waste during manufacturing of the stator.

In some embodiments, the systems and apparatuses described herein may include copper wires cut to length and bent into terminals having a required shape to mate with a corresponding controller. This may provide for a reduced or eliminated need for a plastic base as the terminals are a continuation of the same copper wire connected to the stator (e.g., separate components may not be required). In some embodiments, the systems and apparatuses described herein may be configured to significantly reduce cycle time on a corresponding motor winding machine. In some embodiments, the systems and apparatuses described herein may be configured to provide manufacturing cost reduction, as described. Additionally, or alternatively, the systems and apparatuses described herein may reduce packaging space and reduce a radial footprint of the motor housing, which may eliminate the need for a stator housing, while reducing a part-count (e.g., by 50% or other suitable reduction).

In some embodiments, the systems and apparatuses described herein may be configured to provide a more robust and more cost-efficient alternative to typical lead frames and bus bars, while maintaining design flexibility and applications. The systems and apparatuses described herein may be configured to use copper wires instead of stampings, which may result in zero or substantially zero manufacturing waste and a relatively smaller footprint, while reducing manufacturing costs. In some embodiments, the copper wires may be cut to length and then bent into the desirable shape. In some embodiments, the systems and apparatuses described herein may be configured to eliminate separate terminals, reduce or eliminate complex molding, and/or reduce or eliminate required setup.

In some embodiments, the systems and apparatuses described herein may include a stator that includes a body defining a central bore that is adapted to receive a rotor. The stator also includes a plurality of electrical conductors radially disposed on the body. Each of respective electrical conduction of the plurality of electrical conductors includes a corresponding magnetic core wound in a conductive wire. The stator also includes a wired frame that includes one or more conductive wires. Each of the one or more conductive wires includes a first end and a second end opposite the first end. Each respective first end of the one or more conductive wires is connected to corresponding terminals of the stator. Each respective second end of the one or more conductive wires is bent at an angle and adapted to mate with a controller.

FIG. 1 generally illustrates a vehicle 10 according to the principles of the present disclosure. The vehicle 10 may include any suitable vehicle, such as a car, a truck, a sport utility vehicle, a mini-van, a crossover, a marine craft, an aircraft, an all-terrain vehicle, a recreational vehicle, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

Figure 2B:
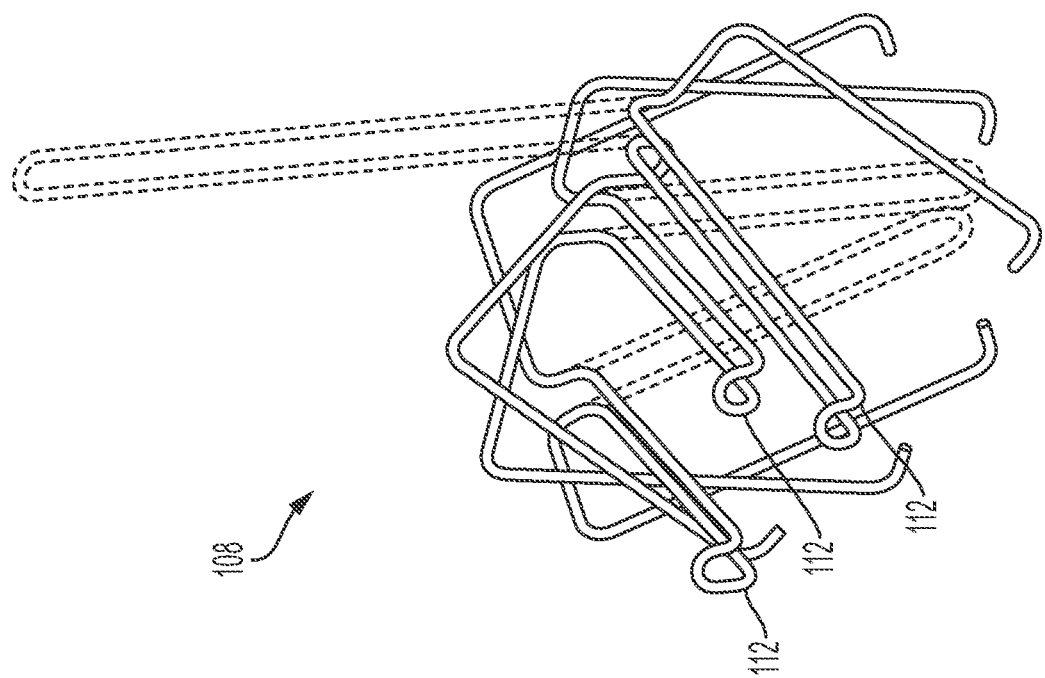
FIGS. 2A and 2B generally illustrates a stator and a wired frame according to the principles of the present disclosure.
Figure 2A:
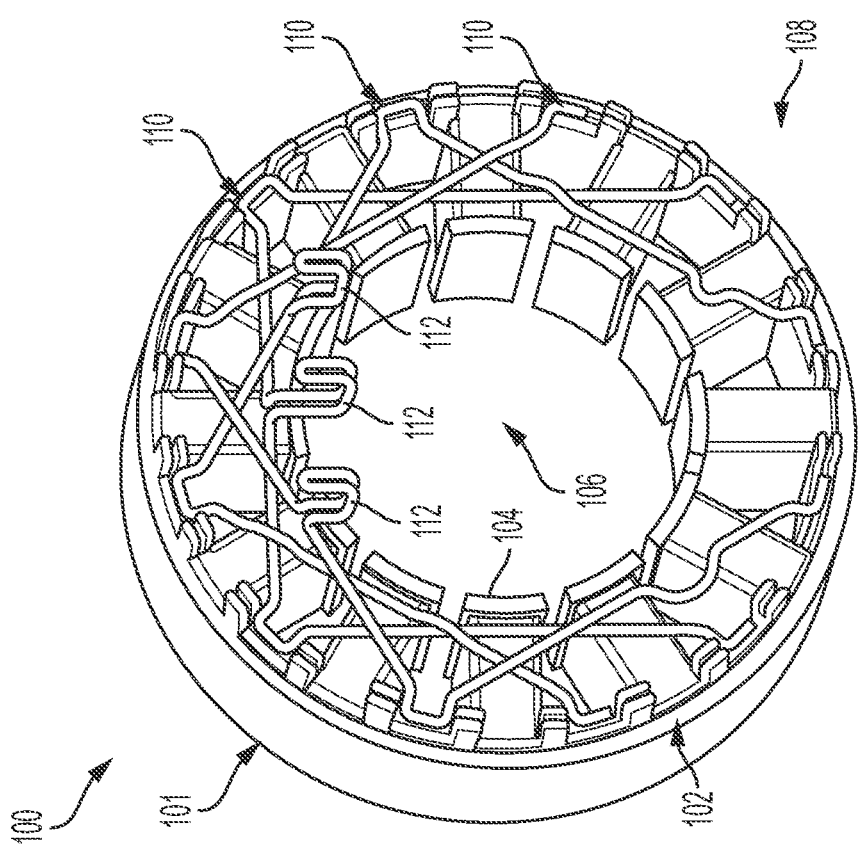

The vehicle 10 may include one or more electromagnetic motors. An electromagnetic motor includes a stator and a rotor. FIGS. 2A and 2B generally illustrate a stator 100 and a wired frame 108 according to the principles of the present disclosure. The stator 100 includes a stationary component of the electromagnetic motor and the rotor (not shown) includes a rotating component of the electromagnetic motor. Typically, energy flows through the stator 100 to or from the rotor in response to the rotor rotating.

The rotor includes a body comprising a substantially circular profile having an outer diameter that corresponds to the inner diameter of the stator 100. The rotor may include one or more magnets radially disposed on the body. The magnets may include permanent magnets or other suitable magnet.

The stator 100 includes a body 101 and one or more electrical conductors 102 comprising a core wound in conductive wire. The body 101 may define a central bore 106 configured to receive the rotor. An electric current may be applied or induced in the electrical conductors 102 to generate a magnetic field that transfers energy to or from the rotor, which may cause the rotor to rotate.

The electrical conductors 102 may include a magnetic core that includes one or more magnetic components. The magnetic core of the electrical conductors 102 may be wound in one or more windings of conductive wire, such as copper wire or other suitable conductive wire. The stator 100 may include stopper tabs 104 disposed at an end of each respective electrical conductors 102. The stopper tabs 104 are adapted to prevent the conductive wire of the electrical conductors 102 (e.g., when the conductive wire is wound on a respective electrical conductor 102) from loosening and interfering with the rotor. The stopper tabs 104 and the body 101 may comprise a unitary construction or the stopper tabs 104 may be disposed on a portion of the body 101.

In some embodiments, the stator 100 includes a wired frame 108 that includes a plurality of conductive wires 110. The conductive wires 110 may include any suitable conductive material. For example, the conductive material may include copper or any other suitable material. The wired frame 108 may include any suitable number of conductive wires 110. For example, the wired frame 108 may include three conductive wires 110. It should be understood that the wired frame 108 may include fewer or additional conductive wires 110 than those described herein. The conductive wires 110 may include rigid or semi rigid conductive wires and may be stamped into relatively complicated shapes.

Figure 3:
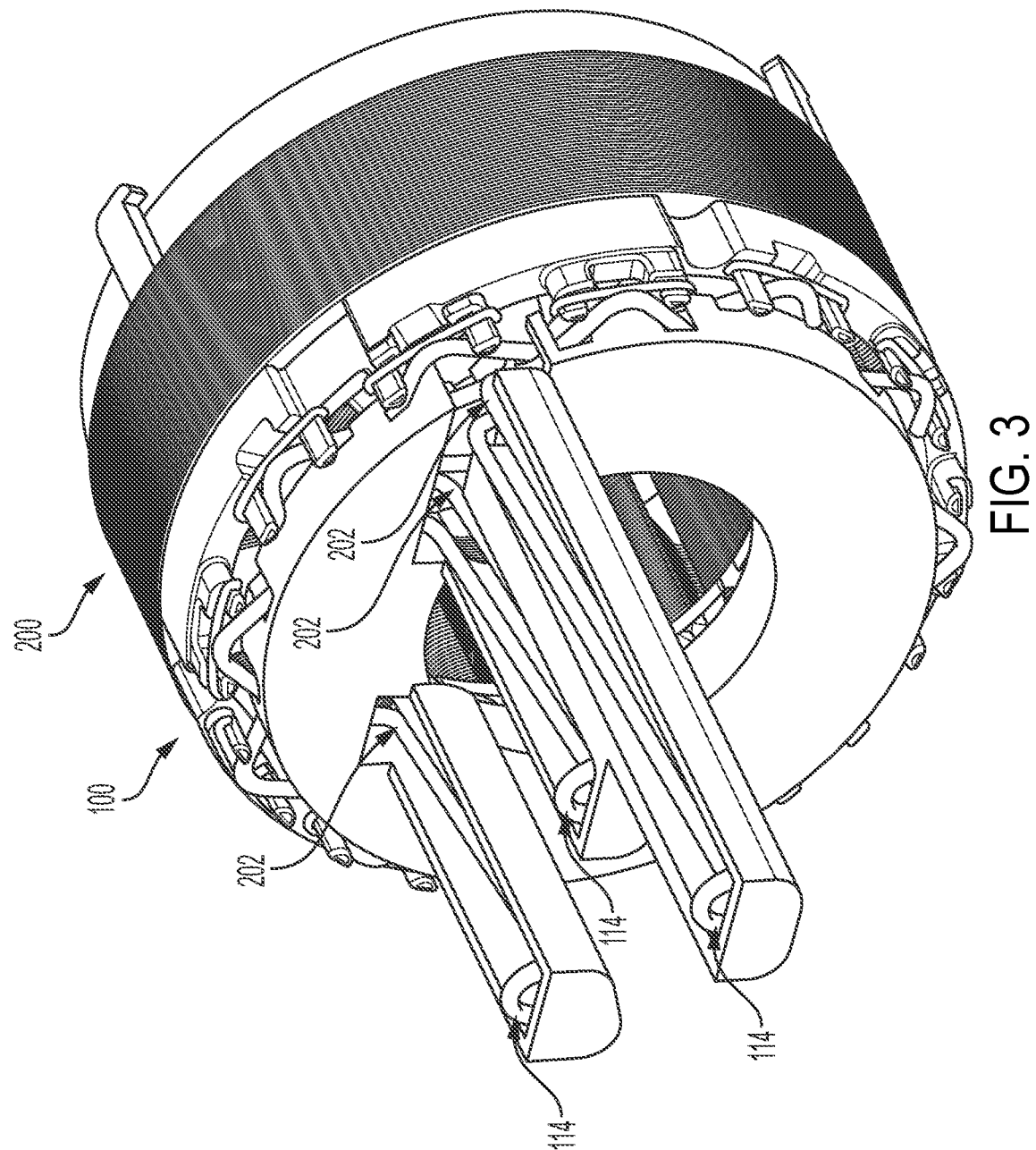
FIG. 3 generally illustrates a portion of a stator assembly according to the principles of the present disclosure.

Each of the conductive wires 110 includes a first end or portion (not shown) and a second end 112 (e.g., which may be referred to as a portion). Each first end of each respective conductive wire 110 may be connected to a respective terminal of the stator 100, such that, in operation, a current may be applied to the electrical conductors 102 via the conductive wires 110. Each second end 112 of each respective conductive wire 110 is bent or shaped at an angle to form respective terminals 114, as generally illustrated in FIG. 3.

Figure 4:
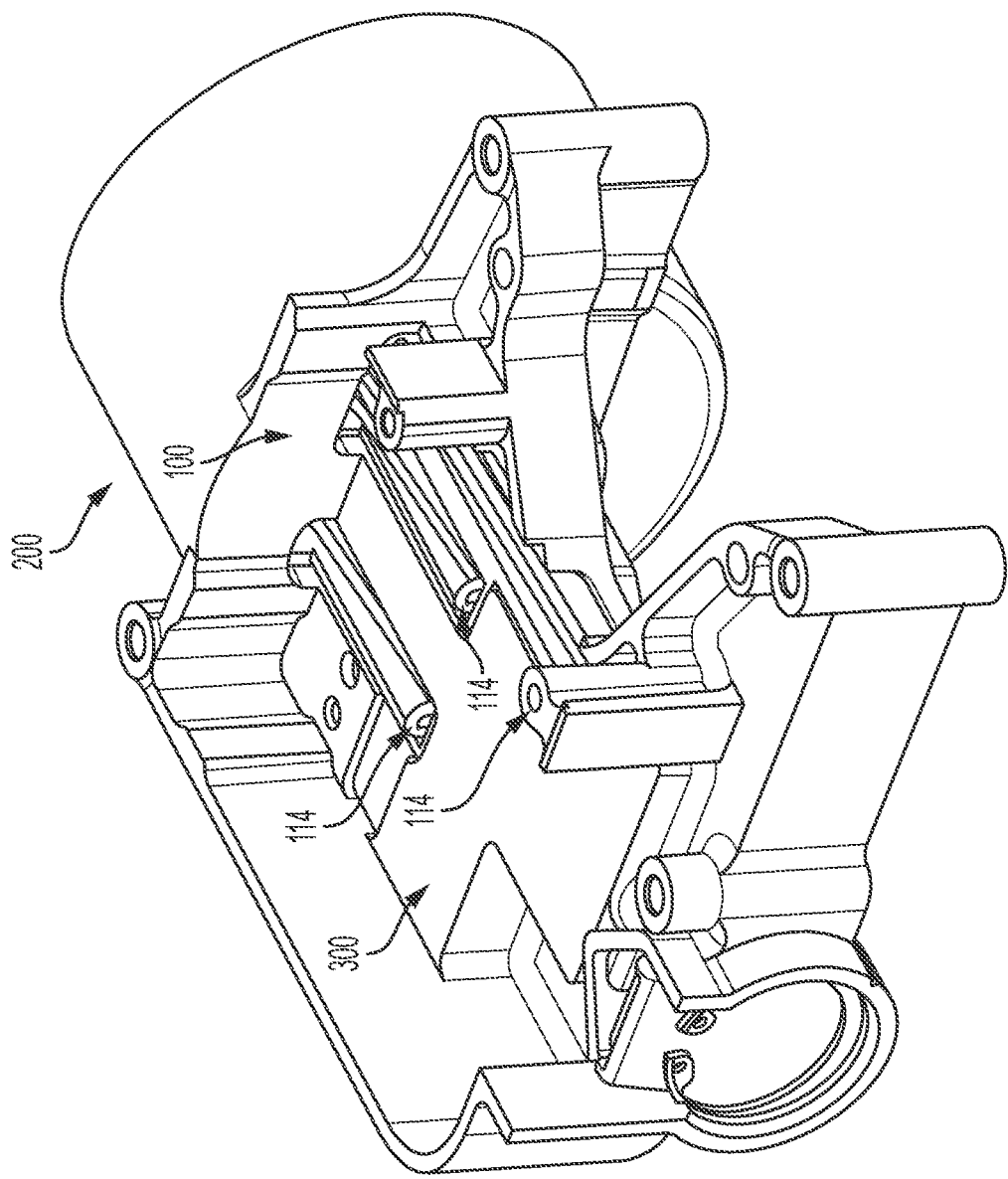
FIG. 4 generally illustrates a partial cutaway view of a stator assembly according to the principles of the present disclosure.

A motor housing 200 may be configured to receive and/or secure the stator 100. The motor housing 200 may include fewer or additional features than those illustrated or described herein. The motor housing may include a plurality of slots 202 configured to receive the terminals 114, such that the terminals 114 protrude from the housing 200. As is generally illustrated in FIG. 4, the terminals 114 are configured to mate with a controller 300. The controller 300 may be any suitable controller. The terminals 114 may be semi-rigidly held in place by the rigidity of the conductive wires 110 and/or by the shape of the terminals 114. The terminals 114 may mate with the controller 300 without additional holding or placement mechanisms during a soldering operation (e.g., the terminals 114 may be self-retaining or stationarily retrained within the slots 202, such that additional holding mechanisms are not required when the terminals 114 are soldered to the controller 300).

The controller 300 may include a processor and a memory. The processor may include any suitable processor, such as those described herein. Additionally, or alternatively, the controller 300 may include any suitable number of processors in addition to or instead of the processor described herein. The memory may comprise a single disk or a plurality of disks (e.g., hard drives), and includes a storage management module that manages one or more partitions within the memory. In some embodiments, memory may include flash memory, semiconductor (solid state) memory or the like. The memory may include Random Access Memory (RAM), a Read-Only Memory (ROM), or a combination thereof. The memory may include instructions that, when executed by the processor, cause the processor to, at least, control various functions of the vehicle 10.

In some embodiments, a stator for a vehicle may include a body defining a central bore that is adapted to receive a rotor. The stator may also include a plurality of electrical conductors radially disposed on the body. The stator may also include a wired frame that includes one or more conductive wires, each of the one or more conductive wires having first end and a second end opposite the first end, wherein each respective first end of the one or more conductive wires is connected to corresponding terminals of the stator, and wherein each respective second end of the one or more conductive wires is bent at an angle to form respective terminals and adapted to mate with a controller.

In some embodiments, each of respective electrical conductor of the plurality of electrical conductors includes a corresponding magnetic core wound in a conductive wire. In some embodiments, the conductive wire wound around each corresponding magnetic core includes a copper wire. In some embodiments, each respective terminal includes a semi-rigid terminal. In some embodiments, each respective terminal is configured to mate with a corresponding slot disposed on motor housing configured to house the body of the stator and the controller. In some embodiments, each respective terminal is self-retaining within the corresponding slots of the motor housing. In some embodiments, the stator may also include a plurality of stopper tabs disposed proximate respective ends of corresponding ones of the electrical conductors. In some embodiments, the plurality of stopper tabs are adapted to prevent conductive wire of the plurality of electrical conductors from interfering with rotation of the rotor. In some embodiments, the plurality of stopper tabs and the body comprise a unitary construction. In some embodiments, the plurality of stopper tabs are disposed on a portion of the body. In some embodiments, the stator may also include an inner diameter corresponding to an outer diameter of the rotor. In some embodiments, the rotor includes a one or more magnets radially disposed on a body of the rotor. In some embodiments, the one or more magnets include one or more permanent magnets.

In some embodiments, a stator may include a body defining a central bore that is adapted to receive a rotor. The stator may also include a plurality of electrical conductors radially disposed on the body. The stator may also include a wired frame that includes one or more conductive wires, each of the one or more conductive wires having first end and a second end opposite the first end, wherein each respective first end of the one or more conductive wires is connected to corresponding terminals of the stator, and wherein each respective second end of the one or more conductive wires is bent at an angle to form respective terminals and adapted to mate with corresponding slots disposed on a motor housing, each of the respective terminals being self-retaining with in corresponding slots of the motor housing.

In some embodiments, each of respective electrical conductor of the plurality of electrical conductors includes a corresponding magnetic core wound in a conductive wire. In some embodiments, the conductive wire wound around each corresponding magnetic core includes a copper wire. In some embodiments, each respective terminal includes a semi-rigid terminal. In some embodiments, the stator also includes a plurality of stopper tabs disposed proximate respective ends of corresponding ones of the electrical conductors. In some embodiments, the plurality of stopper tabs are adapted to prevent conductive wire of the plurality of electrical conductors from interfering with rotation of the rotor.

In some embodiments, an electromagnetic motor may include a stator. The stator may include a body defining a central bore that is adapted to receive a rotor. The stator may also include a plurality of electrical conductors radially disposed on the body, each of respective electrical conductor of the plurality of electrical conductors including a corresponding magnetic core wound in a conductive wire. The stator may also include a wired frame that includes one or more conductive wires, each of the one or more conductive wires having first end and a second end opposite the first end, wherein each respective first end of the one or more conductive wires is connected to corresponding terminals of the stator, and wherein each respective second end of the one or more conductive wires is bent at an angle to form respective terminals and adapted to mate with corresponding slots disposed on a motor housing, each of the respective terminals being self-retaining with in corresponding slots of the motor housing.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation to encompass all such modifications and equivalent structure as is permitted under the law.

Having thus described the invention, it is claimed:

1. A stator for a vehicle, the stator comprising:
a body defining a central bore that is adapted to receive a rotor;
a plurality of electrical conductors radially disposed on the body; and
a wired frame that includes one or more conductive wires, wherein each respective conductive wire of the one or more conductive wires is connected to a corresponding terminal of the stator, and wherein each respective conductive wire of the one or more conductive wires includes a portion that is bent at an angle to form respective terminals, wherein each respective terminal is configured to mate with a corresponding slot extending from a motor housing configured to house the body of the stator and a controller.

2. The stator of claim 1, wherein the plurality of respective electrical conductors, each includes a conductive wire; the conductive wire is wound on a magnetic core.

3. The stator of claim 1, wherein the conductive wire includes a copper wire.

4. The stator of claim 1, wherein each respective terminal is self-retaining within the corresponding slots of the motor housing.

5. The stator of claim 1, further comprising a plurality of stopper tabs disposed proximate respective ends of corresponding ones of the electrical conductors.

6. The stator of claim 5, wherein the plurality of stopper tabs are adapted to prevent conductive wire of the plurality of electrical conductors from interfering with rotation of the rotor.

7. The stator of claim 6, wherein the plurality of stopper tabs and the body comprise a unitary construction.

8. The stator of claim 6, wherein the plurality of stopper tabs are disposed on a portion of the body.

9. The stator of claim 1, further comprising an inner diameter corresponding to an outer diameter of the rotor.

10. The stator of claim 1, wherein the rotor includes a one or more magnets radially disposed on a body of the rotor.

11. The stator of claim 10, wherein the one or more magnets include one or more permanent magnets.

12. A stator comprising:
a body defining a central bore that is adapted to receive a rotor;
a plurality of electrical conductors radially disposed on the body; and
a wired frame that includes one or more conductive wires, wherein each respective conductive wire of the one or more conductive wires is connected to corresponding terminals of the stator, and wherein each respective conductive wire of the one or more conductive wires includes a portion that is bent at an angle to form respective terminals and adapted to mate with corresponding slots extending from a motor housing, each of the respective terminals being self-retaining with-in corresponding slots of the motor housing.

13. The stator of claim 12, wherein the plurality of respective electrical conductors, each includes a conductive wire; the conductive wire is wound on a magnetic core.

14. The stator of claim 12, wherein the conductive wire wound includes a copper wire.

15. The stator of claim 12, further comprising a plurality of stopper tabs disposed proximate respective ends of corresponding ones of the electrical conductors.

16. The stator of claim 15, wherein the plurality of stopper tabs are adapted to prevent conductive wire of the plurality of electrical conductors from interfering with rotation of the rotor.

17. An electromagnetic motor comprising:
a stator that includes:
a body defining a central bore that is adapted to receive a rotor;
a plurality of electrical conductors radially disposed on the body, each of respective electrical conductor of the plurality of electrical conductors comprising a core wound in a conductive wire; and
a wired frame that includes one or more conductive wires, wherein each respective conductive wire of the one or more conductive wires is connected to corresponding terminals of the stator, and wherein each respective conductive wire of the one or more conductive wires is bent at an angle to form respective terminals and adapted to mate with corresponding slots extending from a motor housing, each of the respective terminals being self-retaining with-in corresponding slots of the motor housing.

* * * * *